United States Patent [19]

Byrd et al.

[11] 4,308,197

[45] Dec. 29, 1981

[54] FIRE RESISTANT COMPOSITES

[75] Inventors: Norman R. Byrd, Villa Park; Daniel C. Peek, Long Beach, both of Calif.

[73] Assignee: McDonnell Douglas Corporation, Long Beach, Calif.

[21] Appl. No.: 141,946

[22] Filed: Apr. 21, 1980

[51] Int. Cl.³ ............................................. C08K 5/53
[52] U.S. Cl. ........................... 428/272; 260/45.8 NT;
260/45.9 AA; 260/45.9 E; 260/45.9 AM;
428/413; 428/417; 428/429; 428/435; 428/460;
428/461; 128/463; 428/474; 428/522; 428/524;
260/45.9 NP; 428/273; 428/279; 428/473.5;
428/458
[58] Field of Search ............... 252/609; 260/45.7 PT,
260/45.9 NP, 45.8 NT, 45.9 AA, 45.9 E, 45.9
AM, 502.4 R; 428/921, 413, 417, 429, 435, 442,
447, 460, 461, 463, 524, 522, 474

[56] References Cited

U.S. PATENT DOCUMENTS

| | | | |
|---|---|---|---|
| 2,519,388 | 8/1950 | MacMillan et al. | 428/921 |
| 2,724,718 | 11/1955 | Stiles et al. | 260/502.4 R |
| 3,185,728 | 5/1965 | Schallenberg et al. | 260/502.4 R |
| 3,280,131 | 10/1966 | Wakeman et al. | 260/502.4 R |
| 3,322,716 | 3/1967 | Klein et al. | 260/45.7 PT |
| 3,345,432 | 10/1967 | Gillham et al. | 260/45.9 E |
| 3,363,032 | 1/1968 | Fitch | 260/502.4 R |
| 3,401,185 | 10/1968 | Meinhardt | 260/502.4 R |
| 3,408,390 | 10/1968 | Jungerman et al. | 260/502.4 R |
| 3,668,237 | 6/1972 | Cyba | 260/45.9 NP |
| 3,804,669 | 4/1974 | Buckstie | 428/473.5 |
| 3,944,518 | 3/1976 | Burrows et al. | 260/45.9 NP |
| 3,981,832 | 9/1976 | Godfried | 428/417 |
| 4,077,860 | 3/1978 | Via | 260/502.4 R |

*Primary Examiner*—V. P. Hoke
*Attorney, Agent, or Firm*—Max Geldin

[57] ABSTRACT

Highly fire resistant composites or laminates particularly applicable as structural components in aircraft, e.g. in the engine nacelle, as part of the acoustic panel-fire wall structure, and capable of withstanding a 2,000° F. flame temperature, comprising incorporating an additive in the form of an ammonium salt, or an amine salt, of a phosphonic acid or a phosphinic acid, into a resin, e.g., a polyimide or an epoxy resin, such additive being soluble in the resin. The resulting resin containing the additive, e.g., the ammonium, or amine, salt of phenyl phosphonic or phenyl phosphinic acid, is then applied to or impregnated into a substrate such as glass fiber cloth or graphite fiber, to form a composite structure which is then cured. The resulting cured composite when subjected to high temperatures of the order of, e.g., a 2,000° F. flame temperature, forms a resin char of reduced thermal conductivity which holds the fibers of the laminate together and maintains the structural stability and integrity of the laminate.

27 Claims, 3 Drawing Figures

FIRE RESISTANT COMPOSITES

BACKGROUND OF THE INVENTION

This invention relates to thermal insulation materials having high fire resistance and low thermal conductivity, and is particularly concerned with resin compositions and composites, particularly polyimide or epoxy resin compositions, and composites formed therewith, incorporating certain additives to substantially increase fire resistance, and which are particularly applicable as structural components, e.g., as an acoustic panel-fire wall structure in aircraft.

Considerable effort and funds have been expended over the past several years in programs to develop the potential of organic composite materials for use in aircraft structures, among others. These studies have shown that the use of high-stiffness, high-strength composites, such as graphite-epoxy, can reduce the weight of structural components by as much as 50% and thus improve structural efficiency while providing significant benefits in cost and performance. The most commonly employed class of resins for this use, depending upon the particular application, are epoxies, polyesters, phenolics and polyimides.

Thus, using graphite-polyimide as the composite, a structural component is available that has good strength, is light-weight, and has some intrinsic fire resistance, in that the polyimide will not readily burn at low temperatures. However, at 2,000° F. flame conditions, the polyimide will decompose to form a char on the flame side. This char, though, is so thin that it will allow heat to get through to the backside and decompose the resin. Thus, this could create a hazard due to the possibility of the decomposition products igniting, thereby generating a fire on the backside, even though the parent polymer e.g. polyimide, does not readily burn. Furthermore, with the resin volatilizing away, the heat transfer through the backside is sufficient to ignite other combustible articles in contact with this fire wall. Therefore, a need exists for a non-burning resin composition that has good stability, is a good char former, and has low thermal conductivity.

There are two problem areas where such a non-burning resin composition can be used on an aircraft: (1) in the engine nacelle, as part of the acoustic panel/fire wall structure, and for this application, polyimides are particularly desirable; and (2) as part of the external surface, where graphite/epoxies are the usual materials of construction.

In regard to this latter case, instances have been reported of the resultant degradation of graphite/epoxy composites due to fire and the consequent breaking up of the graphite fibers and the spreading of these fibers to electrical equipment. Thus, any method that is developed to contain these short conductive fibers and prevent their spreading would be of great value.

Therefore, the use of graphite fiber/resin composites depends not only on the strength of the composite due to the presence of the graphite, but on the fire resistance of the resin, as well. There are many additives that, when incorporated into the resin, will act as fire retardants. Some, such as alumina trihydrate, ammonium phosphate, and zinc borate, are solids that offer excellent fire resistance. The hydrated alumina will offer fire protection by giving off water at a relatively low temperature; however, this temperature is usually around the processing temperature of some resins, e.g., polyimides. Ammonium phosphate and zinc borate are effective at higher temperatures, but, as with the hydrated alumina, these are all solid particulates, and they adversely affect the mechanical properties of the laminate, i.e. cause increase in laminate thickness with a consequent decrease in strength. Many other additives are available that are soluble in the resin, but they are good fire retardants only at relatively low fire temperatures, i.e. around 500° F. to 1,000° F.

There accordingly has arisen the need for a substance which can be incorporated into the resin and which will give protection to the resin at high temperatures, e.g. of the order of 2,000° F., to provide a resin composition which is non-burning and has a low thermal conductivity, and wherein such substance functions as a char stabilizer. However, use of resin-soluble additives for this purpose, such as the reaction product of hydroquinone and phenylphosphonic dichloride, although alleged to be a fire retardant when impregnated into clothing (Ger. Offen. No. 2,236,038, Jan. 31, 1974; Ger. Offen. No. 2,236,039, Jan. 31, 1974; Ger. Offen. No. 2,346,787, Apr. 3, 1975; U.S. Pat. No. 3,853,819; U.S. Pat. No. 3,894,986; U.S. Pat. No. 3,900,444; and U.S. Pat. No. 3,941,752), will not withstand temperatures much above 1,000° F. Thus, for aircraft utilization, whether in the engine nacelle, or on the external skin, where burning fuel fires could result in temperatures around 2,000° F., any organic-soluble additive that can result in a stabilized char upon burning is needed.

It has been known that phosphorus derivatives make good fire retarding agents, as exemplified by the following: U.S. Pat. Nos. 3,941,752; 3,900,444; 3,894,986; 3,853,819; 2,577,281; 2,642,413; 2,716,639; 3,450,677; 3,640,823; 3,685,974; 3,712,789; 3,370,029; and 3,963,437 (among others). Most of the work with fire retardant compositions has been concerned with incorporation of various phosphorylated derivatives into polyurethanes, or fiber forming compositions. Furthermore, in most cases, these compositions have had to be stable to relatively low flame conditions, such as burning matches, cigarettes or burning wood, e.g. up to about 800°–1,000° F. When incorporated into a glass cloth/polyimide resin laminate and burned at 2,000° F. (the FAA requirement for burn-through stability), they did not pass.

However, certain compounds have been used as fire retardants that were found to show excellent fire resistance to a 2,000° F. flame. Notable among these was ammonium phosphate. However, ammonium phosphate is not soluble in the resin, e.g. polyimide, system. Thus, the glass-resin laminate formed from such resin system had poor mechanical properties. Accordingly, a resin-soluble additive is required having the high fire retardant behavior of ammonium phosphate.

Accordingly, one object of the invention is to provide resin compositions and composites having high fire resistance and low thermal conductivity. Another object is the provision of compositions and composites of the above type having utility as a fire barrier, particularly applicable as an aircraft structural component, e.g. an acoustic panel-firewall structure capable of withstanding high temperature, e.g. a 2,000° F. flame temperature. A still further object is the provision of resin compositions, particularly polyimide and epoxy compositions, and composites produced therefrom, such as polyimide-glass fabric or epoxy-glass fabric composites or laminates, having incorporated therein a substance which substantially increases the fire resistance of the resin and reduces its thermal conductivity, substantially without adversely affecting the physical and mechanical properties of the composite, and which functions to stabilize the resin or resin char at high temperatures, e.g. a 2,000° F. flame temperature, and maintains the structural integrity of the composite.

SUMMARY OF THE INVENTION

The above subjects and advantages are achieved, according to the invention, by incorporating into a resin such as a polyimide or an epoxy, an ammonium or amine salt of a phosphonic or a phosphinic acid, as described in greater detail below. Such composition is then applied to a suitable substrate, such as glass cloth, to form a "prepreg", and the resin, such as polyimide or epoxy, is cured to obtain a fire resistant composite or laminate. The term "a phosphonic or phosphinic acid" is also intended to include thiophosphonic and thiophosphinic acids.

The additives incorporated into the resin, as noted above, are ammonium or amine salts of phosphonic acids or phosphinic acids, particularly organic derivatives thereof, including aliphatic, aromatic and heterocyclic substituted phosphonic and phosphinic acids. Such compounds are soluble in the above noted resins, e.g. polyimide or epoxy, and upon curing of the resin composition and composite containing such compounds or additives, there is no adverse effect on the mechanical properties of the cured composite or laminate. Such composite offers substantial protection against burning, particularly at high temperatures, e.g. at 2,000° F. At such temperatures, e.g. a 2,000° F. flame condition, the presence of a sufficient amount of the above additive in the composite results in stabilization of the resin char which is formed. This enables such char to hold the fibers of the substrate, e.g. glass or graphite fibers, together and maintain the structural stability and integrity of the composite or laminate. The resin char also has reduced thermal conductivity due to the heat dissipation capability of the carbonaceous residue.

The ammonium or amine salt of a phosphonic or a phosphinic acid, according to the invention, preferably is incorporated into a polyimide or epoxy resin. Such polyimide can be either a condensation type polyimide or an addition type polyimide. Epoxy resins which can be employed include the epoxy resin produced by condensation of bisphenol A and epichlorohydrin. Other resins into which the ammonium or amine salt additive of the invention also can be incorporated include polybenzimidazoles, polyquinoxylines, polyacrylates, phenolic polymers and silicones, in order to enhance their fire resistance. The polybenzimidazole is the reaction product of 2,2'-diamino benzidine with the phenyl ester of p,p'diphenyl ether benzoic acid; the polyquinoxyline is the reaction product of 2,2'diamino benzidine with a bis benzene glyoxal. Examples of phenolic polymers which can be employed are the phenol-formaldehyde resins, and examples of silicones are the dimethyl polysiloxanes and methyl phenyl polysiloxanes. Examples of polyacrylates are polymethyl acrylate and polymethyl methacrylate.

The ammonium or amine salt additive such as, for example, the ammonium salt of phenyl phosphinic acid, can be added to the resin, e.g. polyimide, in varying proportions, e.g. ranging from about 5 to about 70 parts, per 100 parts of resin, e.g. polyimide, by weight, to produce the resin compositions of the invention.

Substrates to which the resin compositions of the invention can be applied, include graphite fibers or fabric, glass fibers or fabric, particularly high silica glass fabric such as the material marketed as "Refrasil", low melting point metals such as aluminum, and the like. The resin composition containing the ammonium salt additives, e.g. polyimide containing the ammonium salt of a phosphinic acid, and substrate, can be formed into several plies to produce a composite or laminate, and cured.

In addition to use in aircraft engines, the composites of the invention containing the above additive can also be used as fire walls in homes, in autos (between the passenger compartment and either the engine or the gas tank), in trains, etc.

DETAILED DESCRIPTION OF PREFERRED EMBODIMENTS

As previously noted, the additive employed according to the invention, i.e. the ammonium or amine salt of a phosphonic acid or of a phosphinic acid, can be employed in an amount ranging from about 5 to about 70 parts, per 100 parts of resin or resin solids, by weight, but preferably is employed in an amount ranging from about 10 to about 40 parts, particularly about 20 to about 30 parts, per 100 parts of resin or resin solids, by weight. The additive employed according to one embodiment, has the general formula:

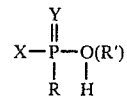

where X is OH, OR, or H; Y is O or S; R is alkyl, either straight chain or branched chain, and generally containing from about 1 to about 6 carbon atoms; e.g. methyl, ethyl, propyl, isopropyl, butyl, isobutyl, pentyl, isopentyl, hexyl and isohexyl; cycloalkyl, generally containing from about 5 to about 6 carbon atoms, such as, for example, cyclopentyl, and cyclohexyl; aryl, generally containing from about 6 to about 14 carbon atoms, such as phenyl, xylyl, tolyl, naphthyl, methylnaphthyl and ethylnaphthyl; the corresponding halogenated alkyl and aryl groups including, for example, the chlorinated and brominated derivatives, such as trichloromethyl, chloroethyl, chloropropyl, chlorophenyl, chlorotolyl, chloronaphthyl, and the corresponding brominated derivatives; nitroaryl such as nitrophenyl, nitrotolyl, and the like; heterocyclic, such as heterocyclics containing O, N or S in the heterocyclic nucleus, e.g. furan, pyrrole, pyridine, thiophene, tetrahydrothiophene, and the like; amino, and alkylamino containing from about 1 to about 8 carbon atoms in the alkyl group, e.g. methylamino, diethylamino, cychlohexylamino, and the like; and R' is ammonia, monoalkylamino, dialkylamino, trialkylamino, monoarylamino, diarylamino, triarylamino, monocycloalkylamino, dicycloalkylamino, tricycloalkylamino, heterocyclic amino, e.g. pyridine, piperidine, and pyrrole. Furthermore, the additive according to another embodiment may have the formula:

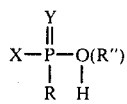

where X, Y and R may be as before, but R" is hydrazine, guanidine, hydroxylamine, or melamine.

Preferred additives are those wherein R is alkyl, aryl or the chlorinated derivatives thereof.

Examples of specific ammonium salts according to the invention are set forth in Table I below.

TABLE I

THE VARIOUS ACIDS USED AS THEIR AMMONIUM SALT (1) Phenyl Phosphonic Acid (2) Phenyl Phosphinic Acid (3) Nitrophenyl Phosphonic Acid (4) Phenyl Thiophosphonic Acid (5) Methyl Phosphonic Acid (6) Methyl Thiophosphonic Acid (7) Ethyl Phosphonic Acid (8) Trichloromethyl Phosphonic Acid Preferred additives are as follows:
Ammonium salt of phenyl phosphinic acid
Ammonium salt of phenyl phosphonic acid
Ammonium salt of methyl phosphonic acid
Ammonium salt of trichloromethyl phosphonic acid
Hydrazine salt of methyl phosphonic acid The ammonium salts listed above can be prepared in known manner as, for example, by dissolving the appropriate phosphonic or phosphinic acid in a solvent, such as diethyl ether, and passing ammonia gas through the solution at a slow rate at a very low temperature, e.g., $-60°$ to $-70°$ C. After the requisite amount of ammonia had been passed through, about 30 percent excess was added and then the excess ammonia and ether allowed to evaporate off. What remains is the ammonium salt of the particular acid.

The amine salt is prepared by dissolving the appropriate phosphonic or phosphinic acid in a solvent, such as ethanol, and adding the amine at a slow rate, e.g. dropwise.

Examples of the preparation of the amine salts are as follows:

EXAMPLE A

Hydrazine Salt of Phenyl Phosphonic Acid

Dissolve 39.53 g (0.25 mole) of phenyl phosphonic acid in 200 ml ethanol, and add 12.52 g (0.25 mole) of hydrazine hydrate dropwise. After all the hydrazine has been added, filter. Yield of salt was 50.52 g (97% yield) of a hydrated salt.

EXAMPLE B

Propylamine Salt of Phenyl Phosphonic Acid

Dissolve 35.52 g (0.25 mole) of phenyl phosphonic acid in 100 ml ethanol, and add 14.78 g (0.25 mole) of normal propylamine dropwise. Filtration of the product yields 47.68 g (94.8%) of the n-propylamine salt.

EXAMPLE C

Diethylamine Salt of Phenyl Phosphonic Acid

Dissolve 35.52 g (0.25 mole) of phenyl phosphonic acid in 100 ml ethanol, and add 18.27 g (0.25 mole) of diethylamine dropwise. The product was allowed to react for 24 hours, and the solvent volatilized off to yield 42.24 g (78.4%) of the diethylamine salt.

EXAMPLE D

Hydrazine Salt of Phenyl Phosphinic Acid

Dissolve 35.52 g (0.25 mole) of phenyl phosphinic acid in 200 ml ethanol, and add 12.52 g (0.25 mole) of hydrazine hydrate dropwise. After the addition was complete, the ethanol was volatilized off to yield a light brown crystalline product.

EXAMPLE E

Guanidine Salt of Phenyl Phosphonic Acid

One mole (180.17 g) of guanidine carbonate was dissolved in 300 ml ethylene glycol at 60° C. Then, one mole (158.10 g) of phenyl phosphonic acid was also dissolved in 100 ml ethylene glycol at 60° C. The phenyl phosphonic acid solution was added to the guanidine solution, dropwise, at 60° C. Carbon dioxide was given off. After the addition was complete the heat was removed, and the solution allowed to cool to room temperature to yield a creamy-white, pasty material.

The ammonium or amine salt additives can be added to the resin, e.g. polyimide, in the required amount, and the resulting mixture applied to the substrate such as graphite fabric or glass fabric, to form a composite or laminate utilizing, e.g. a plurality of fiberglass or graphite cloth plies. The composite is cured at elevated temperature ranging from about 200° to about 350° F. for curing, usually, although not necessarily, followed by a post curing operation at higher temperatures, e.g. ranging from about 400° to about 600° F.

The ammonium salt or amine salt additive is added to the resin, e.g. polyimide, or such additive can be first incorporated in a solvent such as N-methyl pyrrolidone, and the resulting solution added to the resin. The resin containing the additive in solution is then employed to impregnate the substrate such as graphite fabric or glass cloth, to form a composite or laminate, which is then cured as noted above.

The cured composites or laminates are subjected to flame tests employing a burner flame at a temperature of 2,000° F. In these tests the sample composite is mounted vertically, and the flame is impinged on the front face of the composite or laminate, and the temperature of the front face at 2,000° F. is monitored by a thermocouple. Under such condition, samples with substantially reduced burn-off areas on the back face of the composite or laminate after exposure to the 2,000° F. flame for 15 minutes, show stabilization and thermal stability of the resin char and reduced thermal conductivity of the char, due to the presence of the ammonium salt additive.

The following are examples of practice of the invention, taken in connection with the accompanying drawings wherein.

EXAMPLE I 30 grams of the ammonium salt of phenyl phosphinic acid, was dissolved in 135 grams of Skybond 703 polyimide varnish (a condensation type polyimide marketed by Monsanto). The resulting solution was used to impregnate 8 plies of a 9-inch square 181 style Fiberglass cloth (marketed by Owens Corning).

The resulting resin impregnated glass cloth laminate was initially heated for one hour at 175° F. The temperature was then increased over a period of 3 hours to 350° F. and maintained at that temperature for about 2½ hours. The laminate was then post-cured at a temperature of 550° F. for 4 hours.

Skybond 703 is usually sold as a polyamic acid varnish which is converted to a polyimide during heating and curing. However, Skybound 703 is usually referred to as the "polyimide varnish," even though it requires curing to convert it to the polyimide.

Samples of the resulting cured polyimide glass fabric laminate, and samples of a polyimide-impregnated glass laminate control employing the same amount of polyimide and using the same number of plies of 181 style Fiberglass cloth, as for producing the polyimide glass fabric laminate above containing the additive of the invention, and cured by the procedure described above, were subjected to a Meeker burner flame maintained at 2,000° F. by means of a thermocouple, for a period of 15 minutes.

Figure 1:
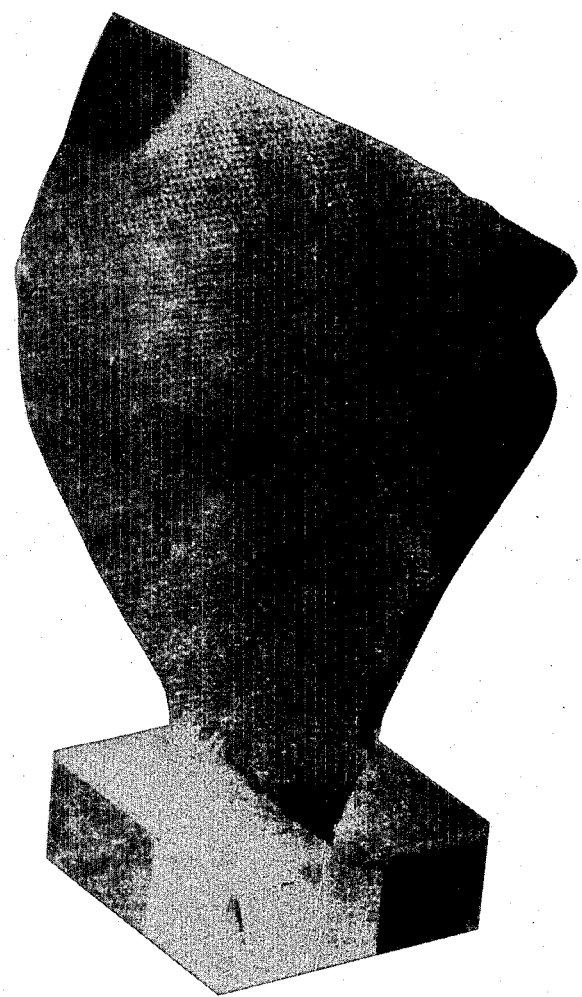
FIG. 1 is a photograph of a polyimide impregnated glass fabric laminate control, showing the burn-off area on the back face thereof, after being subjected to a burner flame at 2,000° F.
Figure 2:
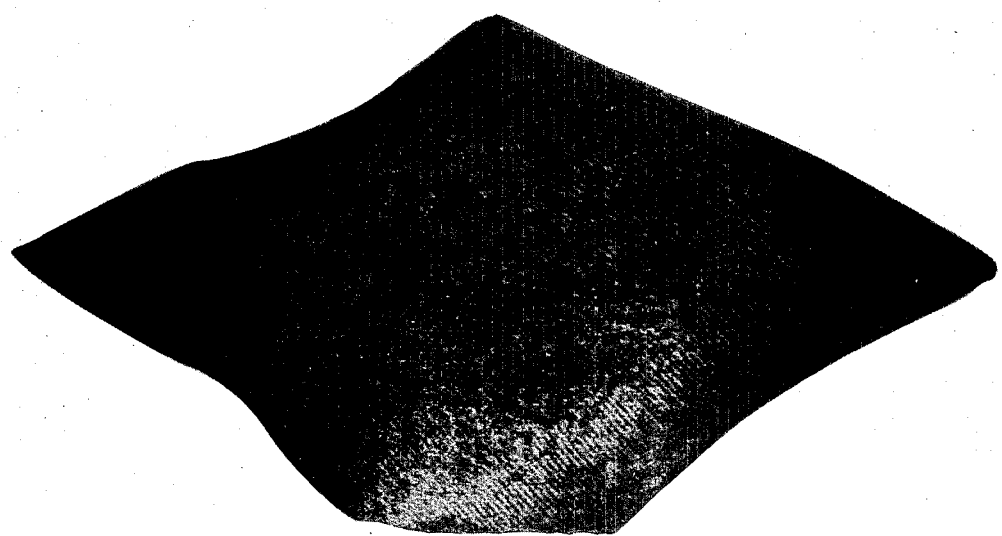
FIG. 2 is a photograph of a polyimide impregnated glass fabric laminate, the polyimide containing the ammonium salt of phenyl phosphinic acid, according to the invention, showing the burn-off area on the back face thereof.

FIG. 1 of the drawings for the polyimide-glass fabric laminate control shows a large burn-off area on the back or rear face of the laminate, resulting from almost complete volatilization of resin, and showed considerable delamination and with a backside temperature of about 1,200° F. and a front face temperature of 2,000° F. FIG. 2 for the polyimide impregnated glass fabric laminate containing the ammonium salt additive of the present example, has an average backside temperature of 470° F. with a front face temperature of 2,000° F., and shows essentially no burn-off areas on the back face of such polyimide glass laminate.

The example, and FIGS. 1 and 2 of the drawing, accordingly show that the resin char formed at the 2,000° F. flame temperature with the polyimide glass laminate of the invention containing the ammonium salt additive can be stabilized, and the resin char has reduced thermal conductivity. Thus, it can be seen that the presence of the ammonium salt additive in the resin stabilizes the char formed, and reduces the resin burn-off on the back face of the laminate due to reduced thermal conductivity of the char.

EXAMPLE II

The procedure of Example I was substantially repeated except that 30 grams of the ammonium salt of phenyl phosphinic acid was employed in combination with 100 grams of Epon 828 Epoxy (a 100% solids material manufactured by Shell Chemical Company) plus 17 grams of RP7A initiator, believed to be a complex aromatic polyamine. The impregnated 8 ply glass laminate was vacuum bag cured for 0.5 hour at 145° F. 0.5 hours at 180° F., two hours at 250° F., and two hours at 300° F. After debagging, it was post cured for two hours at 350° F. and then two hours at 400° F.

During exposure to a 2,000° F. flame, the backside temperature was 460° F. and the results obtained were similar to those obtained in Example I.

EXAMPLE III

Figure 3:
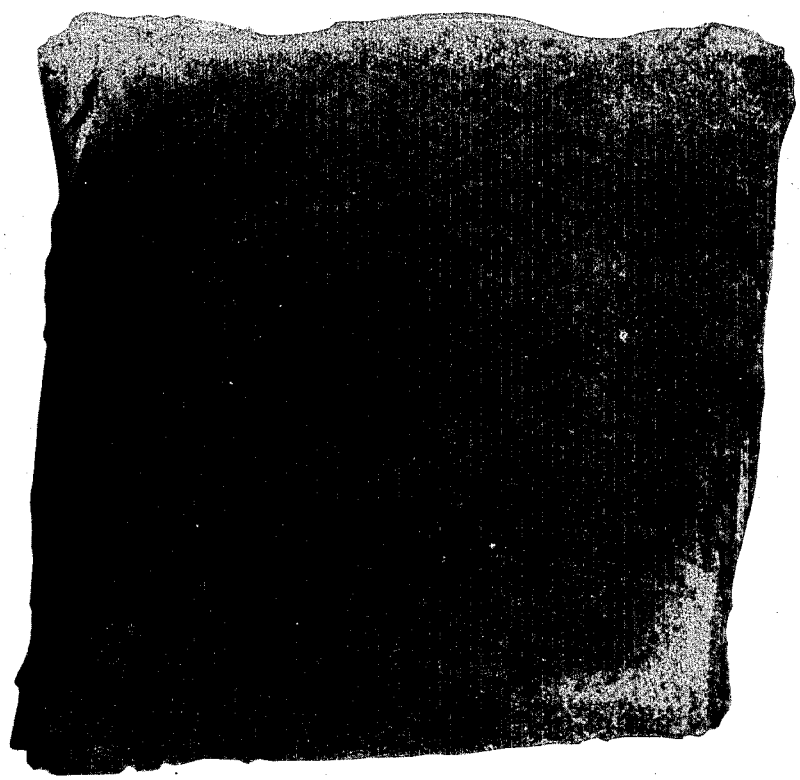
FIG. 3 is a photograph of a polyimide impregnated glass fabric laminate, the polyimide containing the ammonium salt of trichloromethyl phosphonic acid, according to the invention, showing the burn-off area on the back face thereof.

The procedure of Example I was repeated except employing 30 grams of the ammonium salt of trichloromethyl phosphonic acid, in place of the phosphinic acid ammonium salt of Example I. FIG. 3 of the drawing shows that there was essentially no resin burn-off on the rear side of the polyimide-glass cloth laminate treated with the above ammonium salt, as opposed to the untreated polyimide in FIG. 1, and the backside temperature during exposure to the 2,000° F. flame was 480° F.

EXAMPLE IV

The procedure of Example II was repeated using 30 grams of the ammonium salt of trichloromethyl phosphonic acid in 100 grams of Epon 828 Epoxy resin plus 17 grams of RP7A initiator. The results obtained were similar to those of Example II.

EXAMPLE V

The procedure of Example I was repeated except that 15 grams of the ammonium salt of phenyl phosphinic acid was used instead of 30 grams.

The results obtained were similar to those of Example III, in that the backside temperature during a 2,000° F. exposure was 400° F., and there was essentially no resin burn-off on the rear side of the polyimide/glass cloth laminate.

EXAMPLE VI

The procedure of Example III was repeated except that 14.5 grams of the ammonium salt of trichloromethyl phosphonic acid was used instead of 30 grams. The backside temperature during exposure to a 2,000° F. flame was 500° F., and the burn-off on the backside of the panel was minimal.

EXAMPLE VII

The procedure of Example I was repeated except that 30 grams of the diethylamine salt of phenyl phosphonic acid was used instead of the ammonium salt of phenyl phosphinic acid. The backside burn-off was considerably more than in Example I, but not as bad as the untreated polyimide/glass laminate. The thermal transfer, however, was considerably reduced over the untreated polyimide laminate in that the backface temperature was 450° F.

EXAMPLE VIII

The procedure of Example VII was repeated except that 30 grams of the n-propylamine salt of phenyl phosphonic acid was used instead of the diethylamine salt. The backside temperature was 600° F., and the burn-off on the rear face was low.

EXAMPLE IX

The procedure of Example I was repeated except that 30 grams of the ammonium salt of cyclohexyl phosphonic acid was used instead of the ammonium salt of phenyl phosphinic acid. The backside temperature during exposure to a 2,000° F. flame was 450° F., and there appeared to be no burn-off.

EXAMPLE X

The procedure of Example IV was used except 40 grams of the ammonium salt of trichloromethyl phosphonic acid was used in combination with 90 grams of Epon 828 and 17 grams of RP7A initiator.

The results obtained were similar to those of Example IV.

EXAMPLE XI

The procedure of Example VI was repeated except that 6.5 grams of the ammonium salt of trichloromethyl phosphonic acid was employed instead of 14.5 grams. The backside burn-off was more than in Example VI, but not as much as in the untreated polyimide/glass laminate, and the backside temperature, during exposure to a 2,000° F. flame, was 650° F.

EXAMPLE XII

The procedure of Example I was repeated, but 30 grams of the ammonium salt of methyl phosphonic acid was used instead of the ammonium salt of phenyl phosphinic acid. The backside temperature, during exposure to a 2,000° F. flame, was 400° F., and there was essentially no resin burn-off.

EXAMPLE XIII

The procedure of Example VII was used except that 15 grams of the diethylamine salt of phenyl phosphonic acid was used instead of 30 grams.

The results obtained were similar to those of Example VII.

EXAMPLE XIV

The procedure of Example VIII was used except that 15 grams of the n-propylamine salt of phenyl phosphonic acid was used instead of 30 grams.

The backside temperature was 450° F., and the burn-off was more than in Example VII, but not as bad as in the control.

EXAMPLE XV

The procedure of Example XIV was used except that five grams of the n-propylamine salt of phenyl phosphonic acid was used instead of 15 grams.

The results obtained were similar to those of Example XIV.

EXAMPLE XVI

The procedure of Example VII was used except that 30 grams of the dimethylamine salt of phenyl phosphonic acid was used instead of the diethylamine salt of phenyl phosphonic acid.

The backside temperature, during exposure to a 2,000° F. flame, was 400° F., with little burn-off evidenced on the rear.

EXAMPLE XVII

The procedure of Example XVI was used except that 30 grams of the monomethylamine salt of phenyl phosphonic acid was used instead of the dimethylamine salt of phenyl phosphonic acid.

The results obtained were similar to those of Example XVI except the backside temperature was 500° F.

EXAMPLE XVIII

The procedure of Example I was used except that 30 grams of the ammonium salt of methyl thiophosphonic acid was used instead of the ammonium salt of phenyl phosphinic acid.

The burn-off was minimal and the backside temperature was 350° F. during exposure to a 2,000° F. flame.

EXAMPLE XIX

The procedure of Example XVIII was used except that 15 grams of the ammonium salt of methyl thiophosphonic acid was used instead of the 30 grams.

The backside temperature was 650° F. and the burn-off was considerable, but not as bad as the untreated polyimide/glass laminate.

EXAMPLE XX

The procedure of Example XVIII was used except that 30 grams of the ammonium salt of phenyl thiophosphonic acid was used instead of the methyl thiophosphonic acid.

The results obtained were similar to those of Example XVIII.

EXAMPLE XXI

The procedure of Example I was used except that 30 grams of the pyridine salt of phenyl phosphonic acid was used instead of the ammonium salt of phenyl phosphinic acid.

The results obtained were similar to those of Example I.

EXAMPLE XXII

The procedure of Example I was used except that 15 grams of the ammonium salt of phenyl phosphonic acid was used instead of the 30 grams of ammonium salt of phenyl phosphinic acid.

The results obtained were similar to those of Example I.

EXAMPLE XXIII

The procedure of Example XX was used except that 15 grams of the ammonium salt of phenyl thiophosphonic acid was used instead of 30 grams.

The results obtained were similar to those of Example XX.

EXAMPLE XXIV

The procedure of Example I was followed except that 30 grams of the ammonium salt of nitrophenyl phosphonic acid was used in place of the ammonium salt of phenyl phosphinic acid.

The results were similar to those of Example I.

EXAMPLE XXV

The procedure of Example I was followed except that 30 grams of the hydrazine salt of phenyl phosphinic acid was used instead of the ammonium salt.

The results were similar to those of Example I.

EXAMPLE XXVI

The procedure of Example XXV was followed except that 55 grams of the hydrazine salt of phenyl phosphonic acid was used instead of 30 grams of the hydrazine salt of phenyl phosphinic acid.

The results were similar to those of Example XXV.

EXAMPLE XXVII

The procedure of Example XXVI was used except that 16 grams of the hydrazine salt of phenyl phosphonic acid was used instead of 55 grams.

The backside temperature, during exposure to a 2,000° F. flame, was 500° F., and the burn-off was more than in Example XXVI, but better than the polyimide/glass laminate with no additive (control).

EXAMPLE XXVIII

The procedure of Example XXVII was used except that 30 grams of the hydrazine salt of methyl phosphonic acid was used instead of the 16 grams of the hydrazine salt of phenyl phosphonic acid.

The results showed no burn-off in the rear, and the backside temperature was 425° F. during exposure to a 2,000° F. flame.

EXAMPLE XXIX

The procedure of Example XXVIII was followed except that 30 grams of the hydrazine salt of trichloromethyl phosphonic acid was used instead of the hydrazine salt of methyl phosphonic acid.

The results were similar to Example XXVIII.

EXAMPLE XXX

The procedure of Example XXIX was used except that the guanidine salt (from guanidine carbonate) of phenyl phosphonic acid was used instead of the hydrazine salt of trichloromethyl phosphonic acid.

There was some burn-off in the rear, but not as bad as the control, and the backside temperature, during exposure to a 2,000° F. flame, was 500° F.

From the foregoing, it is seen that the invention provides a fire barrier composition and composite having high fire resistance and low thermal conductivity, by incorporating therein additives in the form of an ammonium salt or an amine salt of certain phosphonic and phosphinic acids, and which function to stabilize the char formed from the resin at high temperatures, e.g. a 2,000° F. flame temperature, thereby permitting the char to hold the glass or graphite fibers of a fibrous substrate, such as fiberglass cloth, together and maintain the structural stability and integrity of the composite or laminate.

Since various modifications and changes will occur to those skilled in the art within the spirit of the invention, the invention is not to be taken as limited except by the scope of the appended claims.

What is claimed is:

1. A fire resistant composition having low thermal conductivity, comprising a cured mixture of a resin selected from the group consisting of polyimide, epoxy, polybenzimidazole, polyquinoxyline, polyacrylate, phenolic and silicone resins; and an additive consisting of an ammonium salt or an amine salt of a phosphonic or a phosphinic acid, said additive being soluble in said resin, and employed in an amount sufficient to form a stable resin char when said composition is heated to an elevated temperature sufficient to form said char, said ammonium or amine salt comprising a member selected from the group consisting of aliphatic, aromatic and heterocyclic substituted phosphonic and phosphinic acids.

2. The fire resistant composition as defined in claim 1, wherein said acid is an organic derivative of said phosphonic acid or said phosphinic acid.

3. A fire resistant composition as defined in claim 1, employing about 5 to about 70 parts of said additive, per 100 parts of said resin, by weight.

4. A fire resistant composition as defined in claim 1, wherein said ammonium salt or amine salt of said phosphonic acid or said phosphinic acid contains a group connected to the phosphorus atom selected from the class consisting of alkyl, cycloalkyl, aryl, halogenated alkyl, halogenated aryl, nitroaryl, amino, alkylamino and heterocyclic.

5. The fire resistant composition as defined in claim 3, said resin selected from the group consisting of polyimide and epoxy resins.

6. A fire resistant composition having low thermal conductivity, comprising a cured mixture of a resin selected from the group consisting of polyimide, epoxy, polybenzimidazole, polyquinoxyline, polyacrylate, phenolic and silicone resins; and an additive consisting of an ammonium salt or an amine salt of a phosphonic or a phosphinic acid, said additive being soluble in said resin, and employed in an amount sufficient to form a stable resin char when said composition is heated to an elevated temperature sufficient to form said char, said additive having a general formula from the group consisting of

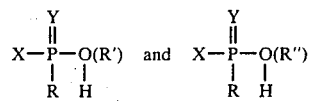

wherein X is OH; OR or H; Y is O or S; R is a member selected from the group consisting of alkyl of from about 1 to about 6 carbon atoms, cycloalkyl of from about 5 to about 6 carbon atoms, aryl of from about 6 to 14 carbon atoms, and the corresponding halogenated alkyl and halogenated aryl derivatives, nitroaryl, heterocyclic, amino, and alkylamino containing about 1 to about 8 carbon atoms in the alkyl group, R' is selected from the group consisting of ammonia, monoalkylamino, dialkylamino, trialkylamino, monoarylamino, diarylamino, triarylamino, monocycloalkylamino, dicycloalkylamino, tricycloalkylamino and heterocyclic amino, and R″ is selected from the group consisting of hydrazine, guanidine, hydroxylamine and melamine.

7. The fire resistant composition as defined in claim 6, wherein R is said alkyl group, said aryl group, or the chlorinated derivatives thereof.

8. The fire resistant composition as defined in claim 6 employing about 5 to about 70 parts of said additive, per 100 parts of said resin, by weight.

9. The fire resistant composition as defined in claim 6, said resin selected from the group consisting of polyimide and epoxy resins.

10. The fire resistant composition as defined in claim 8, said resin being a polyimide, employing about 10 to about 40 parts of said additive, per 100 parts of said resin, by weight.

11. The fire resistant composition as defined in claim 8, said resin being an epoxy, employing about 10 to about 40 parts of said additive, per 100 parts of said resin, by weight.

12. The fire resistant composition as defined in claim 8, said additive being an ammonium salt.

13. The fire resistant composition as defined in claim 8, said additive being an amine salt.

14. The fire resistant composition as defined in claim 8, said additive being a member selected from the group consisting of the ammonium salt of (1) phenyl phosphinic, (2) phenyl phosphonic acid, (3) methyl phosphonic acid, (4) trichloromethyl phosphonic acid, and (5) the hydrazine salt of methyl phosphonic acid.

15. A fire resistant composite having low thermal conductivity, comprising a substrate selected from the group consisting of graphite fabric, glass fabric and a low melting point metal, having applied thereto a composition comprising a cured mixture of a resin selected from the group consisting of polyimide, epoxy, polybenzimidazole, polyquinoxyline, polyacrylate, phenolic and silicone resin; and an additive consisting of an ammonium or an amine salt of a phosphonic or a phosphinic acid, said additive being soluble in said resin and employed in an amount sufficient to form a stable resin char when said composition is heated to an elevated temperature sufficient to form said char, said ammonium or amine salt comprising a member selected from the group consisting of aliphatic, aromatic and heterocyclic substituted phosphonic and phosphinic acids.

16. A fire resistant composite having low thermal conductivity, comprising a substrate selected from the group consisting of graphite fabric and glass fabric, impregnated with a composition comprising a cured mixture of a resin selected from the group consisting of polyimide, epoxy, polybenzimidazole, polyquinoxyline, polyacrylate, phenolic and silicone resin; and an additive consisting of an ammonium or amine salt of a phosphonic or a phosphinic acid, said additive being soluble in said resin and employed in an amount sufficient to form a stable resin char when said composition is heated to an elevated temperature of the order of about 2000° F., said ammonium or amine salt comprising a member selected from the group consisting of aliphatic, aromatic and heterocyclic substituted phosphonic and phosphinic acid.

17. A fire resistant composite as defined in claim 16, employing about 5 to about 70 parts of said additive to 100 parts by weight of said resin, and wherein said ammonium or amine salt of said phosphonic acid or said phosphinic acid contains a group connected to the phosphorus atom selected from the class consisting of alkyl, cycloalkyl, aryl, halogenated alkyl, halogenated aryl, nitroaryl, amino, alkylamino and heterocyclic.

18. A fire resistant composite as defined in claim 17, said resin selected from the group consisting of polyimide and epoxy resins.

19. A fire resistant composite having a low thermal conductivity, comprising a substrate selected from the group consisting of graphite fabric and glass fabric, impregnated with a composition comprising a cured mixture of a resin selected from the group consisting of polyimide, epoxy, polybenzimidazole, polyquinoxyline, polyacrylate, phenolic and silicone resin; and an additive consisting of an ammonium or amine salt of a phosphonic or a phosphinic acid, said additive being soluble in said resin and employed in an amount sufficient to form a stable resin char when said composition is heated to an elevated temperature of the order of about 2,000° F., said additive having the general formula from the group consisting of

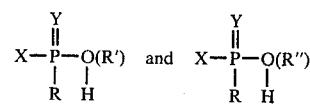

wherein X is OH; OR or H; Y is O or S; R is a member selected from the group consisting of alkyl of from about 1 to about 6 carbon atoms, cycloalkyl of from about 5 to about 6 carbon atoms, aryl of from about 6 to 14 carbon atoms, and the corresponding halogenated alkyl and halogenated aryl derivatives, nitroaryl, heterocyclic, amino, and alkylamino containing about 1 to about 8 carbon atoms in the alkyl group, R' is selected from the group consisting of ammonia, monoalkylamino, dialkylamino, trialkylamino, monoarylamino, diarylamino, triarylamino, monocycloalkylamino, dicycloalkylamino, tricycloalkylamino, and heterocyclic amino, and R″ is selected from the group consisting of hydrazine, guanidine, hydroxylamine and melamine.

20. The fire resistant composite as defined in claim 19, employing about 5 to about 70 parts of said additive per 100 parts by weight of said resin.

21. The fire resistant composite as defined in claim 20, wherein R is said alkyl group, said aryl group, or the chlorinated derivatives thereof, and said resin is selected from the group consisting of polyimide and epoxy resins.

22. The fire resistant composite as defined in claim 21, said additive being employed in an amount of about 20 to about 40 parts, per 100 parts of said resin, by weight.

23. The fire resistant composite as defined in claim 19, said additive being an ammonium salt.

24. The fire resistant composite as defined in claim 19, said additive being an amine salt.

25. The fire resistant composite as defined in claim 19, said additive being a member selected from the group consisting of the ammonium salt of (1) phenyl phosphinic, (2) phenyl phosphonic acid, (3) methyl phosphonic acid, (4) trichloromethyl phosphonic acid, and (5) the hydrazine salt of methyl phosphonic acid.

26. The fire resistant composite as defined in claim 25, said additive being the ammonium salt of phenyl phosphinic acid.

27. The fire resistant composite as defined in claim 25, said additive being the ammonium salt of trichloromethyl phosphonic acid.

* * * * *